US011987257B2

(12) United States Patent
Bower et al.

(10) Patent No.: US 11,987,257 B2
(45) Date of Patent: May 21, 2024

(54) DRIVE SYSTEM CONTROLS ARCHITECTURE FOR OEM INTERFACE AND SERVICES

(71) Applicant: TOYOTA MOTOR ENGINEERING & MANUFACTURING NORTH AMERICA, INC., Plano, TX (US)

(72) Inventors: Laura E. Bower, Whitmore Lake, MI (US); Arlo C. Eitzer, Ann Arbor, MI (US); Daniel K. Lim, Canton, MI (US); Jonathan J. Sander, Greenville, OH (US); Christopher M. Bulpitt, Los Angeles, CA (US); Luke A. Rippelmeyer, Plano, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/539,709

(22) Filed: Dec. 1, 2021

(65) Prior Publication Data

US 2023/0166751 A1 Jun. 1, 2023

(51) Int. Cl.
*B60W 50/10* (2012.01)
*B60W 10/26* (2006.01)
*B60W 10/28* (2006.01)

(52) U.S. Cl.
CPC ............ *B60W 50/10* (2013.01); *B60W 10/26* (2013.01); *B60W 10/28* (2013.01);
(Continued)

(58) Field of Classification Search
CPC ...... B60W 50/10; B60W 10/26; B60W 10/28; B60W 2510/24; B60W 2510/28; B60W 2710/083; B60W 2720/40
(Continued)

(56) References Cited

U.S. PATENT DOCUMENTS

| 5,512,022 A | 4/1996 | Suzuki |
| 6,405,818 B1 | 6/2002 | Anthony |
(Continued)

FOREIGN PATENT DOCUMENTS

| CN | 104972918 | 10/2015 |
| CN | 108092211 A | 5/2018 |
(Continued)

OTHER PUBLICATIONS

Marx et al., "A review of multi-stack and modular fuel cell systems: Interests, application areas and on-going research activities," International Journal of Hydrogen Energy vol. 39 Issue 23, Aug. 4, 2014., pp. 12101-12111.
(Continued)

*Primary Examiner* — Yi-Kai Wang
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods provide a drive system control architecture that comprises a seamless interface between original equipment manufacturer (OEM) vehicle systems or components (e.g., accelerator pedal, brake pedal, accessory components, etc.) and third-party (or non-OEM) vehicle systems or components (e.g., motor/generator (MG) and inverter systems, fuel cell and battery systems, transmission, etc.). A universal interface implemented in a vehicle may receive a request for a specified amount of torque from one or more components of a first set of vehicle components, and may determine a balance between one or more components of a second set of vehicle components for delivering the specified amount of torque. The universal interface may then instruct the one or more components of the second set of vehicle components to deliver a commensurate portion of the specified amount of torque.

17 Claims, 5 Drawing Sheets

(52) U.S. Cl.
CPC ..... *B60W 2510/24* (2013.01); *B60W 2510/28* (2013.01); *B60W 2710/083* (2013.01); *B60W 2720/40* (2013.01)

(58) Field of Classification Search
USPC .......................................................... 701/22
See application file for complete search history.

(56) References Cited

U.S. PATENT DOCUMENTS

| | | | |
|---|---|---|---|
| 6,439,923 | B1 | 8/2002 | Kirkendall |
| 6,672,415 | B1 | 1/2004 | Tabata |
| 2003/0235740 | A1 | 12/2003 | Haltiner |
| 2004/0034460 | A1 | 2/2004 | Folkerts |
| 2004/0263099 | A1 | 12/2004 | Maslov |
| 2009/0025315 | A1 | 1/2009 | Gutfleisch |
| 2013/0151045 | A1* | 6/2013 | Park ............... B60W 20/10 180/65.265 |
| 2013/0241445 | A1 | 9/2013 | Tang |
| 2014/0222265 | A1 | 8/2014 | Miftakhov |
| 2017/0361840 | A1* | 12/2017 | Valentine ............ B60W 30/143 |
| 2018/0086343 | A1 | 3/2018 | Crain |
| 2019/0005183 | A1 | 1/2019 | Nada |
| 2019/0126864 | A1 | 5/2019 | Takamatsu |
| 2019/0222005 | A1 | 7/2019 | Steinkamp |
| 2020/0125858 | A1 | 4/2020 | Bauer |
| 2020/0366030 | A1 | 11/2020 | Go |
| 2021/0344214 | A1 | 11/2021 | Patel |
| 2022/0324322 | A1 | 10/2022 | Kim |

FOREIGN PATENT DOCUMENTS

| | | |
|---|---|---|
| CN | 207853758 | 9/2018 |
| CN | 110085889 | 8/2019 |
| CN | 110521106 | 11/2019 |
| CN | 210126492 U | 3/2020 |
| CN | 112036603 A | 12/2020 |
| JP | 2012060729 A | 3/2012 |

OTHER PUBLICATIONS

Green Car Congress, "Plug power introduces new fuel-cell system for heavy-duty on-road applications," Feb. 18, 2020.

Wang et al., "Hydrogen consumption minimization method based on the online identification for multi-stack PEMFCs system," International journal of hydrogen energy, vol. 44, Issue 11, Feb. 26, 2019.

* cited by examiner

DRIVE SYSTEM CONTROLS ARCHITECTURE FOR OEM INTERFACE AND SERVICES

TECHNICAL FIELD

The present disclosure relates generally to drive control architectures, and more particularly, to a fuel cell (FC)-based interface between an original equipment manufacturer (OEM)-side of a drive control architecture and applicable powertrain components that can effectuate splitting or distributing of a torque request received from the OEM-side based on the applicable powertrain components and their respective operating states.

DESCRIPTION OF RELATED ART

Many vehicles are electric/electrified vehicles or, in other words, vehicles that have an electrified powertrain. The typical electrified vehicle has a more or less traditional drivetrain that includes one or more wheels, as well as a transmission, a differential, a drive shaft and the like, to which the wheels are mechanically connected. However, in place of an engine, the electrified vehicle includes one or more motors/motor-generators. As part of the electrified powertrain, the drivetrain is mechanically connected to the one or more motors/motor-generators. In conjunction with the drivetrain, the motors/motor-generators are operable to power the wheels using electrical energy. More and more such electrified vehicles are fuel cell vehicles (FCVs), or electrified vehicles that include one or more fuel cell stacks. In FCVs, the fuel cell stacks are operable to generate the electrical energy used by the motors/motor-generators to power the wheels. A typical fuel cell can refer generally to a device that obtains electric energy by using hydrogen and oxygen as fuel. Since fuel cells have excellent environmental friendliness, and can realize a high level of energy efficiency, they have been actively developed as energy supply systems of the future.

BRIEF SUMMARY OF THE DISCLOSURE

In accordance with one embodiment, a method comprises receiving, by a universal interface implemented in a vehicle, a request for a specified amount of torque from one or more components of a first set of vehicle components. The method further comprises determining, by the universal interface, a balance between one or more components of a second set of vehicle components for delivering the specified amount of torque. Moreover, the method comprises instructing, by the universal interface, the one or more components of the second set of vehicle components to deliver a commensurate portion of the specified amount of torque.

In some embodiments, the first set of vehicle components includes original equipment manufacturer (OEM)-supplied components.

In some embodiments, the second set of vehicle components includes non-OEM-supplied components.

In some embodiments, the non-OEM-supplied components comprises at least one of powertrain and drivetrain components.

In some embodiments, the request for the specified torque comprises a torque request at a drive shaft or prop shaft of the vehicle.

In some embodiments, determining the balance comprises balancing the one or more components including at least one of a motor and transmission to produce the specified torque at the drive shaft or prop shaft.

In accordance with another embodiment, a vehicle may comprise: a first group of vehicle components from which a user torque request is received; a second group of vehicle components providing motive force to wheels of the vehicle; and a third group of vehicle components providing operative power to the second group of vehicle components. The vehicle may further comprise a universal interface receiving the user torque request, balancing operative output of the second group of vehicle components, and controlling at least one component of the second and third groups of vehicle components to deliver a specified amount of torque to the second group of vehicle components.

In some embodiments, the universal interface comprises splitter logic dividing the user torque request amongst the third group of vehicle components comprising at least a battery and a fuel cell.

In some embodiments, the second group of vehicle components comprises at least a motor generator, and an inverter operatively connected to the battery and the fuel cell.

In some embodiments, the splitter logic receives a supplemental torque request from the transmission.

In some embodiments, the splitter logic takes as an input, a consolidated torque request comprising the user torque request and the supplemental torque request from the transmission.

In some embodiments, the first group of vehicle components includes original equipment manufacturer (OEM)-supplied components.

In some embodiments, the second group of vehicle components includes non-OEM-supplied components.

In some embodiments, the request for the specified torque comprises a torque request at a drive shaft or prop shaft of the vehicle.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

In the consumer vehicle/automotive sector, vehicle manufacturing and design can be skewed towards proprietary elements and integration, whereas in the industrial vehicle/ automotive sector, vehicle manufacturing and design tends to be more standardized. For example, an OEM truck manufacturer can use a first truck component from a first supplier, and that first truck component will typically integrate with a second truck component from a second supplier without issue. There are often standards communication protocols between vehicle systems/elements, requirements, and so on.

Accordingly, various embodiments are directed to a drive system control architecture that comprises a seamless interface between OEM vehicle systems or components (e.g., accelerator pedal, brake pedal, accessory components, etc.) and third-party (or non-OEM) vehicle systems or components (e.g., motor/generator (MG) and inverter systems, fuel cell and battery systems, transmission, etc.). In this way, the more standardized nature of industrial vehicle manufacturing and design can be leveraged to achieve improved drivability, durability, and efficiency. For example, inputs to the interface may comprise simple inputs, e.g., a torque request value or some simple power control request. interface may process such a request without further information or intervention by the OEM vehicle systems. For example, the interface may split the request between, e.g., two fuel cell/battery systems so as to avoid operating a particular fuel cell stack in accordance with only a partial load. As another example, the interface may, based on such inputs, effectuate use of one of multiple MGs at different operating points to extend fuel cell and battery life. The interface may process such a request without further information or intervention by the OEM vehicle systems regardless of the type(s)/source(s) of systems, components, or other aspects of the vehicle beyond the OEM vehicle systems.

Figure 1:
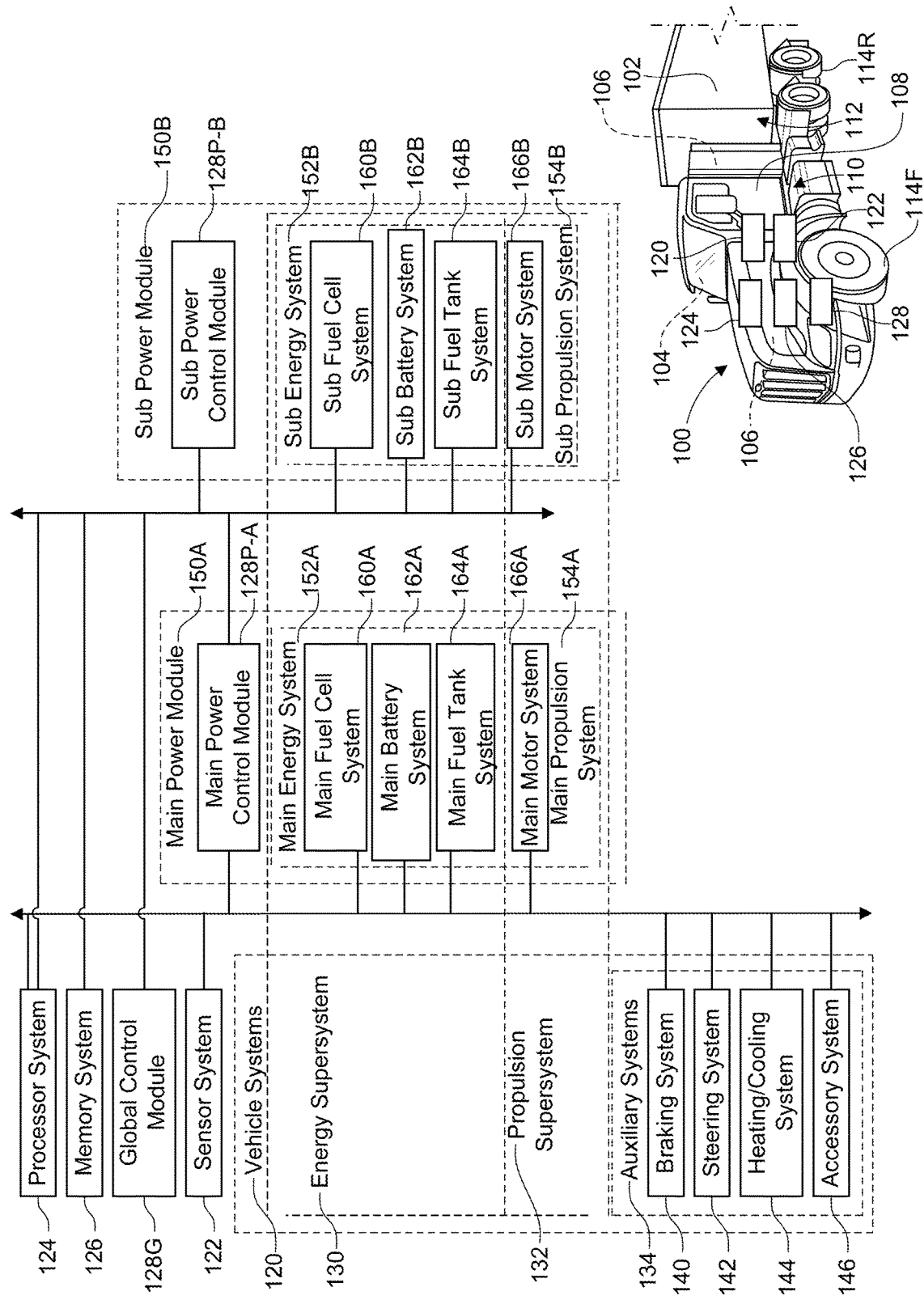
FIG. 1 is a schematic representation of an example fuel cell vehicle in which various embodiments of the present disclosure may be implemented.

FIG. 1 illustrates an embodiment of a vehicle 100, e.g., a heavy duty electric truck/semi-tractor fuel cell vehicle in which a drive system controls architectures, as contemplated herein, may be implemented. Vehicle 100 may have a modular construction. In vehicle 100, the torque request may be distributed between parallel systems in a manner that keeps the fuel efficiency in an optimum range, accounts for differences in efficiencies of different motors, reduces the need to turn-on and off fuel cells, keeps the drivability/ operability of vehicle 100 within an optimum range, and/or keeps the durability of the vehicle 100 within an optimum range.

Although a semi-tractor fuel cell vehicle is used as an example, any vehicle or like system can implement a drive (or other) systems control architecture and interface as disclosed herein. Different aspects or components of vehicle 100 may be supplied by or sourced from different entities, such as third-party manufacturers, OEM suppliers, and so on. It may be desirable that the components or system(s) are modular, and that the modules fit together in a modular manner and/or electrically connected by a modular harness, so that the same modules may be used in different vehicles having different chassis, power requirements, types of fuel cells, and/or different numbers of fuel cell systems.

In this description, uses of "front," "forward" and the like, and uses of "rear," "rearward" and the like, refer to the longitudinal directions of the vehicle 100. The terms "front," "forward" and the like refer to the front (fore) of the vehicle 100, while the terms "rear," "rearward" and the like refer to the back (aft) of the vehicle 100. Uses of "side," "sideways," "transverse" and the like refer to the lateral directions of the vehicle 100, with "driver's side" and the like referring to the left side of the vehicle 100, and "passenger side" and the like referring to the right side of the vehicle 100.

As alluded to above, vehicle 100 may be a semi-tractor. Vehicle 100 may have an exterior compartment and one or more interior compartments. The compartments of vehicle 100 may include a passenger compartment 104 and/or one or more engine compartments 106. Vehicle 100 may include, among other things, seats and a dash assembly housed in its passenger compartment 104.

Vehicle 100 may have a body 108 that forms its exterior and defines the compartments of vehicle 100. Body 108 may have upright sides, a floor, a front end, a rear end, and/or a roof, for example. In the embodiments in which vehicle 100 is a semi-truck, the semitrailer 102 similarly may have an exterior and an interior. Semitrailer may also have an interior compartment and/or a cargo compartment for carrying cargo, which may be an exterior compartment. In addition to body 108, vehicle 100 may have a chassis 110. Chassis 110 may serve as an underbody for vehicle 100. Chassis 110, like the body 108, forms the exterior of the vehicle 100. As part of the chassis 110, the vehicle 100 may include a hitch 112 for hitching semitrailer 102 to vehicle 100. With the semitrailer 102 hitched to vehicle 100, vehicle 100 may be capable of pulling semitrailer 102 and any onboard cargo. In an embodiment, vehicle 100 may be built and/or assembled by a different entity than the entity (or entities) that builds/ assembles part of the engine.

Vehicle 100 may include a modular drivetrain. The drivetrain may be part of, mounted to, or otherwise supported by, chassis 110. The drivetrain may be housed, in whole or in part, in any combination of the passenger compartment 104, the engine compartments 106 or elsewhere in the vehicle 100. As part of the drivetrain, the vehicle 100 may include wheels 114. The wheels 114 support the remainder of the vehicle 100 on the ground. Using a modular fuel cell system (e.g., having a modular drive train), may facilitate accommodating different chassis of different sizes, shapes, and/or configurations.

In the embodiments illustrated in FIG. 1, vehicle 100 includes ten wheels 114, two of which are front wheels 114F, and eight of which are rear wheels 114R (however, in other embodiments there may be a different number of wheels). The rear wheels 114R may be arranged in four dual-wheel setups. The rear wheels 114R belonging to two driver's side dual-wheel setups are shown, with the other two, passenger side dual-wheel setups. The passenger side dual-wheel setups may be mirror images of the driver's side dual wheel setups. The passenger dual-wheel setups may include the remaining rear wheels 114R, which are not shown in FIG. 1. One, some, or all, of the wheels 114 may powered to drive vehicle 100 along the ground. In rear-wheel drive embodiments, one, some, or all, of the rear wheels 114R may be powered to propel vehicle 100 along the ground.

For the purpose of propelling vehicle 100, also as part of the drivetrain, in addition to the wheels 114, vehicle 100 may include a combination of a transmission, a differential, and/or a drive shaft to which the wheels 114 may be mechanically connected. The drive train may be assembled/ built by a different entity than the entity that builds/assembles the semi-trailer 102, compartment 104, body 108, chassis 110, hitch 112, and/or wheels 114.

Vehicle 100 operates as an assembly of interconnected items that equip the vehicle 100 to satisfy real-time vehicle demands. A vehicle demand may correspond to a vehicle function whose performance satisfies the vehicle demand. Accordingly, the vehicle 100 is equipped, in operation, to satisfy one or more vehicle demands by performing one or more corresponding vehicle functions. With respect to performing vehicle functions, vehicle 100 is subject to any combination of manual operations and autonomous operations. For example, vehicle 100 may be manual-only, semi-autonomous, highly autonomous, or fully autonomous.

Vehicle 100 may include one or more vehicle systems 120 for satisfying various vehicle demands. Any of vehicle systems 120 may be capable of performing vehicle functions on behalf of the vehicle 100 (alone or in conjunction with the drivetrain), and thereby satisfying corresponding vehicle demands on behalf of the vehicle 100. Any combination of vehicle systems 120 may be operable to perform a vehicle function.

In addition to vehicle systems 120, vehicle 100 includes a sensor system 122, as well as processor system 124, memory system 126, and one or more control modules 128 (which, again, may be implemented as one control circuit or as a plurality of individual control circuits) to which the vehicle systems 120 and the sensor system 122 are communicatively connected ("control modules 128" is used to collectively refer to global control modules 128G and power control module 128P). Control modules 128 may determine the distribution the generation of power between the submodules of vehicle 100 and/or between the main module and one or more submodules of vehicle 100.

In this specification, the term "main" as in "main module" or "main system" differs from the submodules and/or parallel systems in that the main module or main system may send control signals to control parts of or all of the subsystems and/or submodules. In this specification, the term "parallel systems" is generic to both subsystems and the main system. However, the term "subsystem," is also intended to be generic to both the main system and the other subsystems, and thus when a plurality of "subsystems" are referred to without any indication of the existence of a main system, any of the subsystems may be a main system. In various embodiments "parallel systems" have high voltage systems that are electrically parallel to one another and/or mechanically parallel to one another, but parallel systems may share a common control system. In various embodiments parallel systems convert energy in a fuel and/or stored energy (e.g., in a battery) into mechanical energy that may be converted used for propelling a vehicle, optionally by turning a shaft that directly or indirectly causes the vehicle to travel. Optionally two (or more) parallel systems may turn the same shaft.

The sensor system 122 may be operable to detect information about the vehicle 100. Sensor system 122 can include a plurality of sensors that can be used to detect various conditions internal or external to vehicle 100, and provide information (e.g., sensor information, which may be information that is) indicative of, and/or characterizing the conditions that were sensed to processor system 124 and/or control modules 128.

In various embodiments, one or more of the sensors of sensor system 122 may include their own processing capability to compute the results for additional information that can be provided to control modules 128 (which may include electronic control units). In other embodiments, one or more sensors may be data-gathering-only sensors that provide only raw data to processor system 124 and/or control modules 128. In further embodiments, hybrid sensors may be included that provide a combination of raw data and processed data to control modules 128. Sensors of sensor system 122 may provide an analog output or a digital output.

Sensors of sensor system 122 may be included to detect not only vehicle conditions but also to detect external conditions as well. Sensor system 122 may include sensors that might be used to detect external conditions, which may include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Processor system 124 may include one or more processors. Processor system 124, the memory system 126 and the control modules 128, together, may serve as one or more computing devices whose control modules 128 are employable to orchestrate the operation of vehicle 100.

Specifically, control modules 128 may operate vehicle systems 120 based on information about the vehicle 100. Accordingly, as a prerequisite to operating vehicle systems 120, the control modules 128 may gather information about vehicle 100, including any combination of the information about the vehicle 100 detected by sensor system 122 and/or information about the vehicle 100 communicated between the control modules 128. Control modules 128 may then evaluate the information about the vehicle 100, and control modules 128 may operate the vehicle systems 120 based on their evaluation. As part of the evaluation of the information about the vehicle 100, the control modules 128 may identify one or more vehicle demands. When a vehicle demand or request is identified, the control modules 128 may operate one or more associated vehicle systems 120 to satisfy the vehicle demand/request.

The vehicle systems 120 may be part of, mounted to or otherwise supported by the chassis 110. The vehicle systems 120 may be housed, in whole or in part, in any combination of the passenger compartment 104, the engine compartments 106, or elsewhere in the vehicle 100. Each vehicle system 120 may include one or more vehicle elements or components. Each vehicle element/component may operable to perform, in whole or in part, any combination of vehicle functions with which the vehicle system 120 is associated. It will be understood that the vehicle elements, as well as the vehicle systems 120 to which they belong, may be mutually distinct but need not be mutually distinct.

The vehicle systems 120 may include an energy supersystem 130 and a propulsion supersystem 132. The energy supersystem 130 and the propulsion supersystem 132 may be electrically connected to one another. The drivetrain may be mechanically connected to propulsion supersystem 132. The propulsion supersystem 132 and the drivetrain together serve as an electrified powertrain for vehicle 100. The energy supersystem 130 may perform one or more energy functions, including but not limited to generating electrical energy. The propulsion supersystem 132 is operable to perform one or more propulsion functions using electrical energy from the energy supersystem 130, including but not limited to powering the wheels 114.

Specifically, the energy supersystem 130 may be operable to generate electrical energy, store electrical energy, condition electrical energy, and/or otherwise handle electrical energy, and store and otherwise handle fuel. In conjunction with the drivetrain, the propulsion supersystem 132 may be operable to power the wheels 114 using electrical energy from the energy supersystem 130. With the wheels 114 powered, the propulsion supersystem 132 may be used to accelerate vehicle 100, maintain the speed of vehicle 100 (e.g., on level or uphill ground) and otherwise drive the vehicle 100 along the ground. The propulsion supersystem 132 may also generate electrical energy using one, some or all of wheels 114, and consequently retard wheels 114 to decelerate the vehicle 100, maintain the speed of the vehicle 100 (e.g., on a downhill surface or road) and otherwise drive the vehicle 100 along the ground. The retarding of wheels 114 may be used for regenerative braking, and the energy from the regenerative braking, may be stored for later use.

In addition to the energy supersystem 130 and the propulsion supersystem 132, the vehicle systems 120 may include one or more auxiliary systems 134. The auxiliary systems 134 may include a braking system 140, a steering system 142, a heating/cooling system 144, and/or an accessory system 146. The auxiliary systems 134, such as the propulsion supersystem 132, are electrically connected to the energy supersystem 130. The auxiliary systems 134 are operable to perform one or more auxiliary functions using electrical energy from the energy supersystem 130, including, but not, limited to frictional braking the vehicle 100, steering the vehicle 100, cooling the vehicle 100, heating the vehicle 100, and/or one or more accessory functions. Accordingly, although the propulsion supersystem 132 acts as the principal electrical load on the energy supersystem 130, the auxiliary systems 134 may also place electrical loads on the energy supersystem 130 and on individual parallel system of energy supersystem 130, as well.

As part of sensor system 122, vehicle 100 may include one or more onboard sensors. The sensors monitor the vehicle 100 in real-time. These sensors, on behalf of the sensor system 122, may detect information about the vehicle 100, including information about user requests and information about the operation of the vehicle 100. Sensor system 122 may include sensors for detecting the level and/or usage of hydrogen, water, and/or other compounds used in fuel or powering vehicle 100. Sensor system 122 may detect the amount of charge remaining in one or more batteries, and/or the capability of one or more batteries to hold a charge. It should be understood that these are non-limiting examples of the types of sensors that may comprise sensor system 122.

Vehicle 100 includes user controls, via which user requests are sent and/or sensed (e.g., a shift, accelerator, brakes, controls for climate control, mirrors, and/or lights). The user controls serve as interfaces between users of vehicle 100 and the vehicle 100 itself, and may receive mechanical, verbal, and/or other user inputs requesting vehicle functions. In conjunction with corresponding user controls, and among the sensors, the vehicle 100 includes an accelerator pedal sensor, a brake pedal sensor, a steering angle sensor, a shift sensor, one or more selector sensors, one or more microphones, and/or one or more cameras, for example. Relatedly, among information about user requests, the sensor system 122 may be operable to detect user inputs requesting powering the wheels 114, user inputs requesting braking, steering, and/or switching gears, for example; user inputs requesting heating, and/or cooling, for example; and/or user inputs requesting accessory functions, for example.

Also among the sensors of sensor system 122, the vehicle 100 may include one or more speedometers, one or more gyroscopes, one or more accelerometers, one or more wheel sensors, one or more thermometers, one or more inertial measurement units (IMUs), and/or one or more controller area network (CAN) sensors, for example. Among information about the operation of the vehicle 100, sensor system 122 may detect the location and motion of the vehicle 100, including the speed, acceleration, orientation, rotation, and/or direction of vehicle 100, for example; the movement of the wheels 114, the temperatures of the vehicle 100; and/or the operational statuses of one, some or all of the vehicle systems 120, the batteries, and/or the motors of vehicle 100.

As noted above, the processor system 124, the memory system 126 and the control modules 128 together serve as one or more computing devices whose control modules 128 orchestrate the operation of vehicle 100. The control modules 128 include a global control module 128G. Global control unit 128G may include an electric hybrid vehicle electronic control unit (EHV ECU). As part of a central control system, vehicle 100 may include a global control unit (GCU) to which the global control module 128G may belong. Global control unit 126B may apportion requests for power and/or torque between the parallel system of vehicle 100 and/or between the main system of vehicle 100 and one or more parallel systems of vehicle 100, and Global control unit 126B may determine how much power and/or torque each parallel system and/or the main system each should produce. The control modules 128 may also include one or more power control modules 128P. Relatedly, the vehicle 100 includes one or more power control units (PCUs) to which the power control modules 128P belong. Although the processor system 124 and the memory system 126 are shown as being common to the GCU and the PCUs, any combination of, or all of, the GCU and the PCUs may be standalone computing devices with one or more dedicated processor system 124 and dedicated memory system 126.

The global control module 128G orchestrates the global operation of the vehicle 100, including but not limited to the operation of the vehicle systems 120, on behalf of the GCU. The power control modules 128P orchestrate the operation of the energy supersystem 130 and the propulsion supersystem 132, as well as certain auxiliary systems 146, on behalf of the PCUs.

Power control modules 128P may include circuitry to control various aspects of the vehicle operation. Power control modules 128P may include, for example, a microcomputer that includes a one or more processing units (e.g., microprocessors), memory storage (e.g., RAM, ROM, etc.), and I/O devices. The processing units of control modules 128 may execute instructions stored in memory to control one or more electrical systems or parallel systems in the vehicle. Control modules 128 can include a plurality of electronic control units (ECUs), such as an electronic engine control module, a powertrain control module, a transmission control module, a suspension control module, and/or a body control module (for example). As a further example, electronic control units may be included for controlling systems and functions such as doors and door locking, lighting, human-machine interfaces, cruise control, telematics, braking systems (e.g., ABS or ESC), battery management systems, and so on. The various control units can be implemented using two or more separate electronic control units or using a single electronic control unit.

In the example illustrated in FIG. 1, sensor system 122 receives information from a plurality of sensors included in vehicle 100. For example, control modules 128P may receive signals that indicate vehicle operating conditions or characteristics, or signals that can be used to derive vehicle operating conditions or characteristics. The signals may include, but are not limited to accelerator operation amount, ACC, a rotational speed, NMG, of the motor system 166 (motor rotational speed), and vehicle speed, NV. These may also include brake operation amount/pressure, B, battery SOC (i.e., the charged amount for one or more batteries of battery system 162 detected by an SOC sensor).

The processor system 124 may be any components configured to execute any of the processes described herein or any form of instructions to carry out such processes or cause such processes to be performed. The processor system 124 may be implemented with one or more general purpose or special purpose processors. Examples of suitable processor system 124 include microprocessors, microcontrollers, digital signal processors or other forms of circuitry that execute software. Other examples of suitable processor system 124 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry and/or controllers. The processor system 124 may include at least one hardware circuit (e.g., an integrated circuit) configured to carry out instructions contained in program code. In arrangements where there are multiple processor parallel systems within processor system 124, the parallel system of processor system 124 may work independently from each other or in combination with one another.

The memory system 126 is a non-transitory computer readable medium. The memory system 126 may include volatile or nonvolatile memory, or both. Examples of suitable memory system 126 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory system 126 includes stored instructions in program code. Such instructions are executable by the processor system 124 or the control modules 128. The memory system 126 may be part of the processor system 124 or the control modules 128, or memory system 126 may be communicatively connected the processor system 124 or the control modules 128.

Control modules 128 may control the electric drive components of the vehicle as well as other vehicle components. Control modules 128 may include machine instructions that may be executed by the processor system 124. The control modules 128 may be implemented as computer readable program code that, when executed by the processor system 124, execute one or more of the processes described herein. Such computer readable program code may be stored on the memory system 126. The control modules 128 may be part of the processor system 124 or may be communicatively connected the processor system 124.

As part of the vehicle systems 120 performing vehicle functions on behalf of the vehicle 100 (to satisfy corresponding vehicle demands on behalf of the vehicle 100), the energy supersystem 130 may perform energy functions (e.g., functions that involve generating and/or consuming energy), and thereby satisfy corresponding energy demands, the propulsion supersystem 132 is operable to perform propulsion functions, and thereby satisfy corresponding propulsion demands, and the auxiliary systems 134 are operable to perform auxiliary functions, and thereby satisfy corresponding auxiliary demands.

From the perspective of the global control module 128G and the power control modules 128P, and the orchestration of the global operation of the vehicle 100, the vehicle demands include one or more global vehicle demands or, in other words, vehicle demands common to the vehicle 100. Specifically, one or more of the energy demands may be global energy demands, and one or more of the propulsion demands may be global propulsion demands. The global energy demands may include any combination of one or more demands to generate electrical energy, one or more demands to store electrical energy, and one or more demands to store and otherwise handle fuel. The global propulsion demands may include one or more demands to power the wheels 114 and one or more demands to retard the wheels 114. Any combination of the global energy demands, and the global propulsion demands, may be part of global combined energy and propulsion demands, such as one or more demands to regeneratively brake the vehicle 100. Any auxiliary demand may be a global auxiliary demand. The global auxiliary demands may include any combination of one or more demands to frictionally brake the vehicle 100, one or more demands to steer the vehicle 100, one or more demands to cool the vehicle 100, one or more demands to heat the vehicle 100 and one or more demands to perform accessory functions.

Beyond being equipped to satisfy the global vehicle demands by performing corresponding vehicle functions, the vehicle 100 may be equipped to satisfy one or more vehicle demand requirements. Specifically, in relation to being operable to perform vehicle functions, and thereby satisfy corresponding global vehicle demands, the vehicle systems 120 have the capacity to satisfy vehicle demand requirements on behalf of the vehicle 100. Accordingly, the energy supersystem 130 has the capacity to satisfy certain energy demand requirements, the propulsion supersystem 132 has the capacity to satisfy certain propulsion demand requirements, and the auxiliary systems 134 have the capacity to satisfy certain auxiliary demand requirements.

Vehicle demand requirements are specific to particular vehicle applications or vocations. In this specification a "vocation" refers to a specific end use and/or product made by the entire process or by the second entity or last entity (e.g., the OEM). For example, one vocation may be a beer truck (which may require refrigeration), another vocation may be a garbage truck, whereas another vocation may be passenger bus. For example, the vehicle 100, as a semi-tractor application, has higher energy demand requirements and higher propulsion demand requirements than many other vehicle applications. In some cases, one vocation of vehicle 100 may have multiple times the energy demand requirements and multiple times the propulsion demand requirements of another vocation.

For purposes of realizing the capacity to satisfy the energy demand requirements and the capacity to satisfy the propulsion demand requirements, the vehicle 100 includes multiple power module main system 150A and parallel systems 150B (referenced generally using "power modules 150" or "power module parallel systems 150") whose vehicle elements are may be mechanically linked. In various embodiments, each power modules 150 is electrically isolated from other power module parallel systems. Although the vehicle 100, as shown, includes two power module parallel systems 150A and 15B, in other embodiments, more than two power modules 150 may be included. In relation to the power modules 150, the energy supersystem 130 includes multiple energy main system 152A and parallel systems 152B (collectively energy systems 152) that may each have a corresponding main propulsion system 154A and sub propulsion system B (referred to collectively energy systems 154) in propulsion supersystem 132.

In each power system module 150, the propulsion system 154 and the energy system 152 may be electrically connected to one another. Moreover, the drivetrain is mechanically connected to each propulsion parallel system 154. Each energy system 152 may perform energy functions with which the energy supersystem 130 may be associated (e.g., on behalf of propulsion parallel systems 154), including but not limited to generating electrical energy. Similarly, each propulsion system 154 may perform propulsion functions (e.g., the power system module 150 to which it belongs and) with which the propulsion supersystem 132 is associated using electrical energy, including but not limited to powering the wheels 114. Each propulsion system 154 is, specifically, operable to perform propulsion functions using electrical energy from the energy system 152 of the power module system 150 to which it and the energy parallel system 152 belong.

Each energy parallel system 152, and the power module system 150 to which it belongs, may include a main fuel system A and one sub fuel system B (referred to collectively as fuel cell system 160), a main battery system 162A and sub battery 162B (referred to collectively battery system 162), and/or a main fuel tank system 164A (referred to collectively as fuel tank system 164) and sub fuel tank system 164B (referred to collectively as fuel tank system 164). Each propulsion system 154, and the power module system 150 to which it belongs, may include a motor system 166. Inside each power module system 150, the motor system 166 is electrically connected to the corresponding fuel cell system 160, so as to power the motor system 166. The battery system 162 and the corresponding fuel cell system 160 may be electrically connected to one another, so that the fuel system 160 may recharge battery system 162, and both may power the corresponding and the motor system 166. Additionally, battery system 162 may provide transient power demands, so that the corresponding a relatively constant power draw from the corresponding fuel system 160 while the fuel corresponding fuel system 160 is used for powering the corresponding motor system 166.

The motor(s) of motor parallel systems 166 can be powered by the battery (or batteries) of battery parallel systems 162 to generate a motive force to move the vehicle 100 and adjust vehicle speed. The motor(s) of motor parallel systems 166 can also function as a generator to generate electrical power such as, for example, when coasting or braking. Battery parallel systems 162 may also be used to power other electrical or electronic systems in the vehicle. A given battery system 162 may have different power demands than other battery parallel systems 162 as a result of powering a different set of other electrical systems (e.g., it may be that one or more battery parallel systems 162 do not power any other electrical systems and/or that only one of battery parallel systems 162 powers all of the other accessory and/or auxiliary electrical parallel systems). A given motor of motor parallel systems 166 may be connected to a given battery of battery parallel systems 162, via an inverter. The batteries of battery parallel systems 162 may include, for example, one or more batteries, capacitive storage units, or other storage reservoirs suitable for storing electrical energy that can be used to power an electric power motor. The batteries of battery parallel systems 162 may be implemented using one or more batteries, the batteries can include, for example, nickel metal hydride batteries, lithium ion batteries, lead acid batteries, nickel cadmium batteries, lithium ion polymer batteries, and/or other types of batteries.

Control modules 128 may control an inverter to adjust driving current supplied to one or more motors of motor system 166, and adjust the current received from the motor during regenerative coasting and breaking. As a more particular example, output torque of the motor can be increased or decreased by control modules 128 through the inverter.

Fuel cell parallel systems 160 are fluidly connected to fuel tank parallel systems 164. Fuel cell parallel systems 160 may generate electrical energy using energy from the fuel from fuel tank system 164. In conjunction with the drivetrain, motor parallel systems 166 power the wheels 114 using electrical energy from any combination of fuel cell parallel systems 160 and battery parallel systems 162. The distribution of power generated by different power module parallel systems 150 and the distribution of power generated by each battery system 160 as compared to the corresponding fuel parallel system may be adjusted to extend the life of the battery parallel systems 160 and maintain an optimum durability and drivability of the vehicle 100.

Battery parallel systems 162 may be provided by a first entity (e.g., a first supplier or manufacturer), and a second entity (e.g., a second provider or manufacturer), which adds fuel cell parallel systems 160 and fuel tank parallel systems 164 to battery parallel systems 162 to form a kit that is provided to a third entity (e.g., an OEM). Control modules 128 may be communicatively connected to fuel parallel systems 160, battery parallel systems 162, fuel tank system 164, motor parallel systems 166, and/or other parts of vehicle 100 by the modular harness.

The motor parallel systems 166 may also generate electrical energy using the wheels 114, and consequently retard wheels 114. Battery system 162 may store electrical energy from the corresponding fuel cell system 160. Battery system 162 may store electrical energy from the corresponding motor system 166. Fuel tank system 164 is operable to store and otherwise handle fuel, including fueling the corresponding fuel cell system 160 with fuel. The power module parallel systems 150 may be "stacked" for purposes of realizing the capacity to satisfy the energy demand requirements and the capacity to satisfy the propulsion demand requirements of the vehicle 100 to which they belong. Specifically, given an energy demand requirement, in each power module 150, the energy system 152 has the capacity to satisfy a share of the energy demand requirement.

Power module parallel systems 150 to which the energy parallel systems 152 belong have the capacity to in combination satisfy the energy demand requirement, with the contribution of each energy parallel system being added together to fulfill the energy requirement of vehicle 100. In various embodiments, the energy supersystem 130 has the capacity to satisfy the energy demand requirement of vehicle 100 as well based on the contribution of each energy system 152. Similarly, given a propulsion demand requirement, in each power module system 150, the propulsion system 154 has the capacity to satisfy a share of the propulsion demand requirement of vehicle 100. With the propulsion parallel systems 154 each having the capacity to satisfy a share of the propulsion demand requirement, power module parallel systems 150 to which the propulsion systems 154 belong have the capacity to contributorily satisfy the propulsion demand requirement. With the propulsion systems 154 likewise belonging to the propulsion supersystem 132, the propulsion supersystem 132 has the capacity to satisfy the propulsion demand requirement as well. In an embodiment, one or more of energy parallel systems 152 may be able to power vehicle 100 alone, for at least short duration of time and optionally on a continuous, ongoing, and/or long-term basis.

Given a global energy demand, in each power module 150, the energy system 152 may be operable to satisfy a share of the global energy demand. With the energy systems 152 each operable to satisfy a share of the global energy demand, the power module parallel systems 150 to which the energy parallel systems 152 belong may be operable to contributorily satisfy the global energy demand. With the energy parallel systems 152 likewise belonging to the energy supersystem 130, the energy supersystem 130 is operable to satisfy the global energy demand as well. Similarly, given a global propulsion demand, in each power module 150, the propulsion system 154 may be operable to satisfy a share of the global propulsion demand. With the propulsion parallel systems 154 each operable to satisfy a share of the global propulsion demand, the power module parallel systems 150 to which the propulsion systems 154 belong are operable to contributorily satisfy the global propulsion demand. With the propulsion systems 154 likewise belonging to the propulsion supersystem 132, the propulsion supersystem 132 is operable to satisfy the global propulsion demand as well.

Although vehicle demand requirements are specific to particular vehicle applications, some vehicle demand requirements are less vocation-dependent than others, and a semi-tractor vocation (for example), may still have similar auxiliary demand requirements as many other vehicle vocations.

In various embodiments, the auxiliary systems 134 perform functions that are common to the vehicle 100, rather than having multiple parallel system relationships. In relation to the power module parallel systems 150 and the energy supersystem 130, one or more of the auxiliary elements, either individually or as part of the auxiliary systems 134 to which they belong, are assigned to the power module parallel systems 150. At each power module system 150, each assigned auxiliary element, either individually or as part of the auxiliary system 134 to which it belongs, as the case may be, is electrically connected to at least one of the energy parallel systems 152. On behalf of the vehicle 100 and the auxiliary system 134 to which a given one of power module parallel systems 150 belongs, each assigned auxiliary element is operable to perform auxiliary functions using electrical energy from at least one of the energy parallel systems 152. Accordingly, in each power module system 150, although the propulsion system 154 acts as the principal electrical load on the energy system 152, the assigned auxiliary elements act as electrical loads on the energy system 152 as well. However, given a global auxiliary demand, the assigned auxiliary elements are operable to satisfy the global auxiliary demand on an unassigned basis.

As noted above, the power control modules 128P orchestrate the operation of the energy supersystem 130 and the propulsion supersystem 132, as well as certain auxiliary systems 146. Power control modules 128P is used to collectively refer to main control module 128P-A and sub control module 128P-B. Power control module 128P Specifically, in relation to the arrangement of the energy supersystem 130 and the propulsion supersystem 132 across the power module parallel systems 150, the vehicle 100 includes multiple parallel system power control modules 128P (e.g., parallel system power control modules 128P-A and 128P-B). In the vehicle 100, each power control module 128P is assigned a power module 150. With each power module 150 including an energy system 152 and a propulsion system 154, each power control module 128P is assigned an energy system 152 and a propulsion system 154. Moreover, one or more power control module 128P may also be assigned control over auxiliary elements. Specifically, one or more power control module 128P may be assigned the auxiliary elements assigned to the power module 150 that, in turn, may be assigned to the power control module 128. Each power control module 128 orchestrates the operation of the assigned power module 150, including the operation of the assigned energy system 152 and the operation of the assigned propulsion system 154, as well as the operation of the assigned auxiliary elements.

Interface

Figure 2:
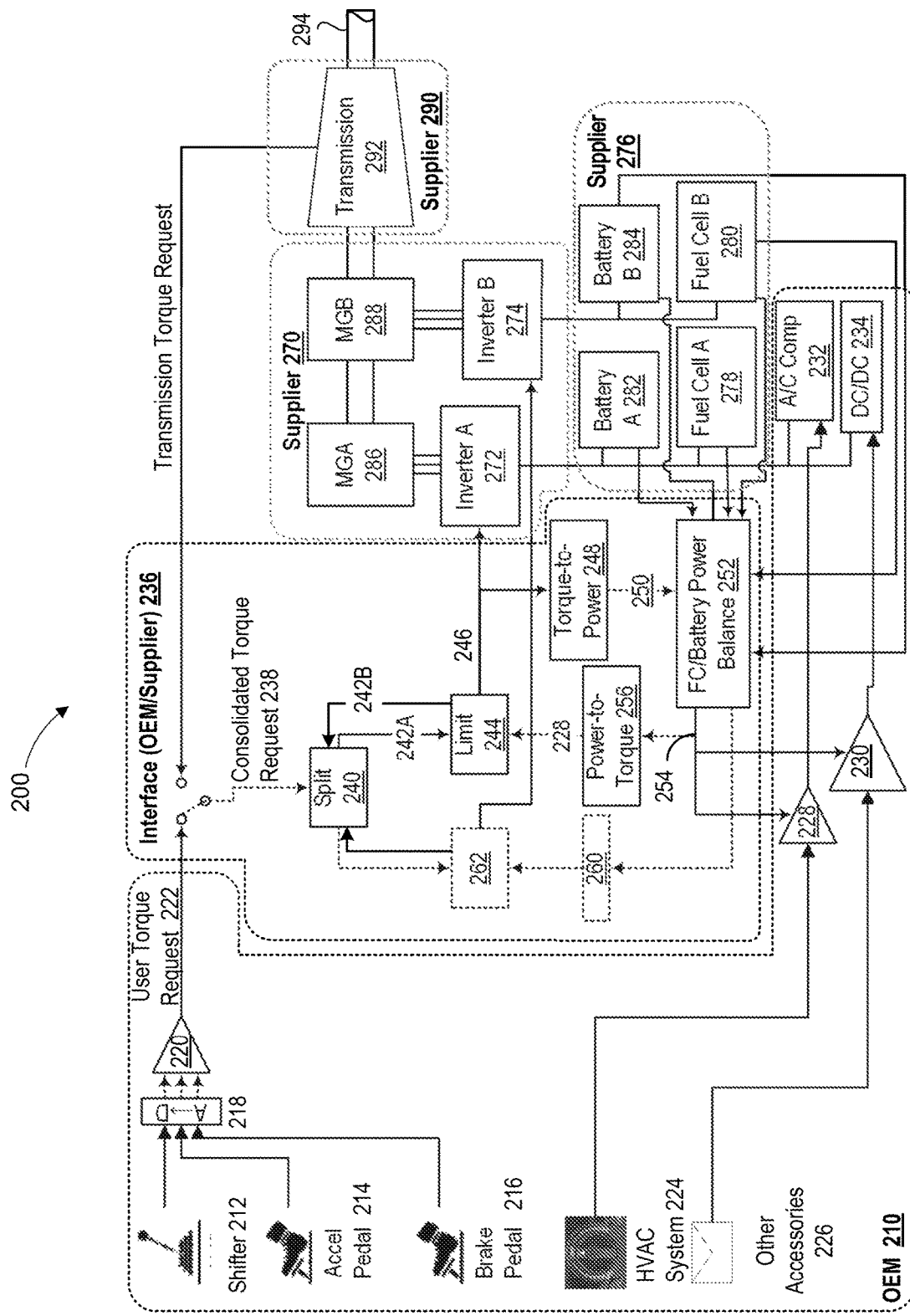
FIG. 2 is a schematic representation of an example architecture for implementing a universal interface for processing torque requests in accordance with one embodiment of the present disclosure.

FIG. 2 illustrates aspects of a vehicle 200, which may be an embodiment of vehicle 100 of FIG. 1. Vehicle 200 may be delineated, for purposes of various embodiments, into aspects/components provided or supplied by an OEM provider/manufacturer, along with other aspects/components of vehicle 200 that may be provided or supplied by another entity, such as a supplier/provider other than the OEM. It should be understood that the corresponding portions of vehicle 200 that may be OEM-provided and third party supplier-provided can vary in other embodiments. As noted above, an interface is provided such that OEM systems may request a certain amount of torque or power to be provided in response to a driver or vehicle-initiated request/operation. Regardless of the origin(s) of the drivetrain/powertrain components of the vehicle, the interface can process the request appropriately without the OEM systems having to know/understand/communicate directly with those drivetrain/powertrain components.

Requests for power and torque are generated in the OEM side 210 of system 200 and the transmission. Shifter/gearshift 212 effectuates gear shifts for vehicle 100, which, depending on the current gear and vehicle speed, can influence the amount of torque requested for the drivetrain. The shifter 212 can also be used to control gearing for, e.g., different road grades (declines/inclines), or for other situations where a greater amount of power may be necessary to travel at a given speed. The amount of energy and/or power required to generate a particular amount of torque, depends on the gear to which shifter 212 is set, and consequently, shifter 212 affects the conversion factor between converting torque requests to power requests and the conversion factor between power requested and the amount of torque that will be obtained. It should be understood that FC vehicles may not utilize a clutch or gears, as such FC vehicles may only have a single gear. For example, electric motors may generate all their torque at lower speeds. In other embodiments, FC vehicles may use gears, e.g., two gears, four gears, and so on. It should be noted that the more gears that are used, the better optimized power delivery may be, e.g., more granular.

Accelerator pedal 214 reflects a desired speed request for changing or maintaining a particular speed. It should be understood that this request can be an acceleration response equivalent to a throttle response in conventional vehicles. The brake pedal 216 creates a request to reduce the amount of torque provided, apply negative torque, or actuate friction brakes to a desired degree so as to stop or slow vehicle down. The analog signals from the shifter 212, accelerator pedal 214, and brake pedal 216 may be sent to an Analog to Digital converter 218 to convert the analog signals to digital signals/controls that can be understood by vehicle 200's ECU, e.g., percent of deflection in the case of a pedal, which may then may be sent to signal combiner 220. It should be noted that in some embodiments, vehicle 200 may include a jake brake/engine braking functionality (not illustrated). Accordingly, in some embodiments, such a jake brake may be another vehicle component with which a user can request the application of torque (in addition to accelerator and brake pedals 214 and 216, respectively.

Signal combiner 220 generates a signal indicative of the appropriate amount of toque to request. Signal combiner 220, determines the signal to generate (e.g., determines how much torque and/or power to request), based on signals form the shifter 212, accelerator pedal 214, and/or brake pedal 216. The amount of torque to request may also depend on the current speed of the vehicle and/or the current torque being supplied, because, at least some of the time, less torque and/or power may be required to maintain a particular speed than to obtain a that speed. Signal combiner 220 creates user torque request 222, which is a request for a particular amount of torque that is estimated to be needed for running the vehicle the in the manner requested. In various embodiments, signal combiner 220 may implement the following algorithm. Signal combiner 220 may make a determination of the state of shifter 212. If shift 212 is in a no-torque state, such as park or neutral, no torque is requested. If shifter 212 is not in a no-torque state, a signal combiner 220 may make a determination as to whether shifter 212 is in a gear for moving forward or in a gear for moving in reverse, and some amount of torque that moves the vehicle forward will be requested if shifter 212 is in a gear for moving forwards and a torque that moves the vehicle backward will be requested if shifter 212 is in a gear for traveling in reverse. Next, signal combiner 220 may determine which forward gear or backward gear the vehicle is in to determine a conversion between the power requested and the torque requested. It should be noted that in some embodiments, interface 236 may determine the requisite transmission drive gear (e.g., gear one through four) based on how system 200 may be optimized, and fed back to OEM side 210. Next signal combiner 220 may determine the state of the accelerator pedal 214 and/or brake pedal 216 to determine how much power is being requested. In some embodiments, as described herein, only a torque request is received from OEM side 210. By the nature of having all information exchanged as a torque value, the system can be made universal and not required to read the analog input of an accelerator or brake pedal position. In an embodiment, the more accelerator pedal 214 is depressed, the more power is requested. If brake pedal 216 is depressed, the amount of power requested may be reduced. In some embodiments, a brake torque request instead of a power reduction request with the application of the brake pedal can be received, where in general, positive torque corresponds with acceleration, while negative torque corresponds with deceleration. Next, signal combiner 220 may convert the power request to a torque request, using a power to torque conversion factor that is based on which gear, shifter 212 is currently in. In some embodiments, requested torque is torque at the prop shaft (downstream of the transmission, and used to deliver power from the transmission to the differential). Interface 236 may receive the prop shaft torque requests, and subsequently optimize the motors and transmission to get the requested torque produced at the prop shaft. Torque at the prop shaft may be considered to be effective torque at the wheels (after going through axle differential, which is fixed), so is more universal than torque to a specific motor configuration. It should be understood that in some contexts, the terms prop shaft and drive shaft may be interchangeable, while in other situations, prop shaft may refer to a transmission-differential connection, whereas a drive shaft can refer to the shaft connecting the differential to the wheels. Regardless, in some embodiments, the torque request may, alternatively, be at the differential output.

Similarly, heating ventilation and air conditioning (HVAC) system 224 may generate signals that request heat, ventilation (which may involve running a fan), air conditioning, and/or other climate control-related requests. That is, HVAC system 224 may, effectively request power to adjust the climate according to the user's comfort. Other accessories 226 may include a radio, lights, a navigation system, a refrigeration system, electrically powered windows, and/or any other accessories, for example. When activated, other accessories 226 request electrical power for running such accessories. Requests for electrical power to meet the demands of HVAC system 224 and other accessories 226 are sent to electrical signal combiners 228 and 230, respectively. Signal combiner 228 combines the signal from HVAC system 224 with a signal indicative of the maximum power available for climate control. Signal combiner 228 may place a limit on how much power can be diverted from one or more the parallel systems of system 200 to HVAC system 224 based on the current state of the power generation system. The output of signal combiner 228 may be sent to an A/C air compressor 232, and A/C air compressor, if air conditioning was requested, which draws an appropriate amount of power from one or more of the parallel systems of the power generation system to run compressor 232. Signal combiner 230 combines the signal from other accessories 226 with a signal indicative of the maximum power available for the other accessories. Signal combiner 230 then sends the signal to DC/DC inverter 234 to draw the amount of power necessary for the accessories that are powered by one or more of the parallel systems. DC/DC converter 234 draws an appropriate amount of power from one or more of the parallel systems of the power generation system based on the power requested by other accessories 226 and the signal indicative of the maximum amount of power available limit of the how much power. In the embodiment of system 200, the total power may be requested by an original equipment manufacturer (OEM) using the interface of system 200.

Shifter 212, accel pedal 214, brake pedal 216, HVAC 224, and/or other accessories 525 may be used by the driver (or other user) requests power from system 200. It should be understood that in some embodiments, vehicle 200 may be autonomous or semi-autonomous (e.g., operative in conjunction with an advanced driver assist system (ADAS)). Accordingly, vehicle 200's ECU or other motive control system(s) may provide the requisite input, or power/torque requests in some embodiments. In an embodiment, total power requested by the user is determined by the interface formed by shifter 212, accel pedal 214, brake pedal 216, HVAC 224, and/or other accessories 525. AC/DC converter 218, signal combiner 220, electrical signal combiners 228 and 230, further modify the power request, whereas A/C compressor 232 and DC/DC converter 234 draw power from one or more of the parallel system of system 200, which may limit the available power for fulfilling torque requests by the parallel systems from which the power was drawn. Since accessories may draw power from some of parallel systems (e.g., from just one or more parallel systems), but not draw any power from other parallel systems, the parallel systems may not have an equal amount of power available for generating torque (assuming if each of the parallel systems would otherwise have the same capacity for generating power), and may inherently have different amounts of power available for torque request and/or other purposes.

Distribution Logic

Figure 3:
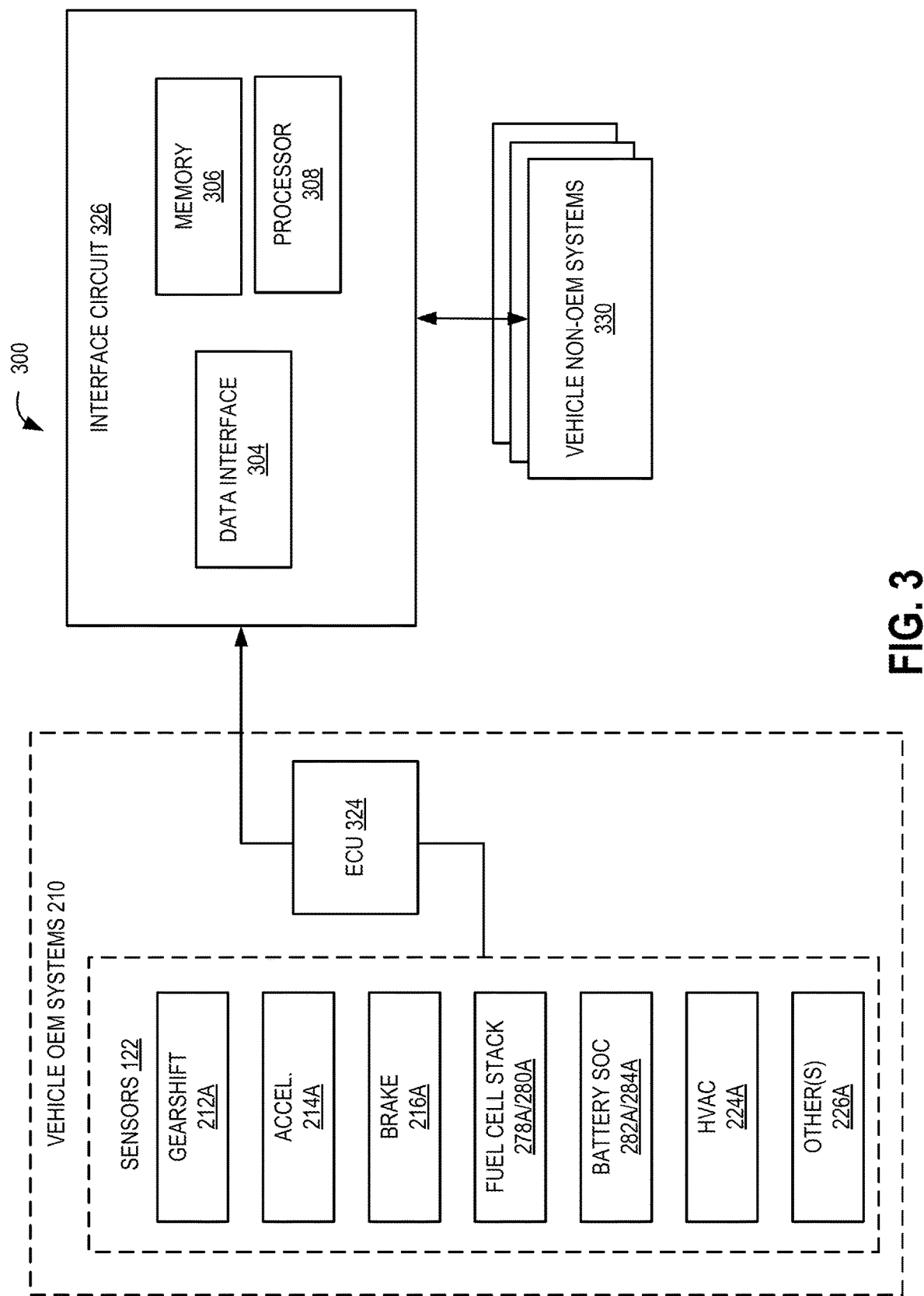
FIG. 3 is a schematic representation of universal interface logic of which the example architecture of FIG. 2 is an embodiment.

FIG. 3 is a schematic representation of the system architecture and interface logic 326 (which embodies the interface 236 of FIG. 2), and which may be a supplier interface, an OEM interface, or other interface), and may comprise logic for controlling torque and power generation. FIG. 3 will be described in conjunction with FIG. 4 which is a flowchart illustrating example operations to effectuate torque and power distribution specified by OEM systems via non-OEM systems.

Figure 4:
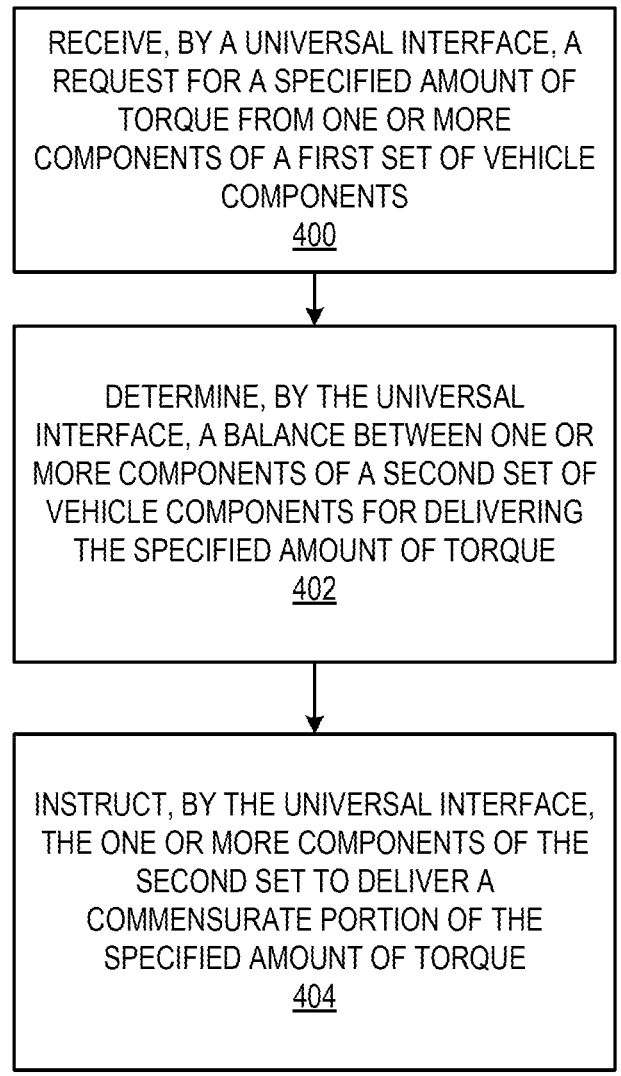
FIG. 4 is a flow chart illustrating example operations that can be performed to process torque requests via a universal interface in accordance with various embodiments of the present disclosure.

Referring to FIG. 4, at operation 400, a request for a specified amount of torque is received, by a universal interface, e.g., interface 236/326, from one or more components of a first set of vehicle components. As discussed above, the first set of vehicle components may be components on the OEM side of a vehicle, e.g., torque requests based on accelerator pedal actuation, brake actuation, accessory operation, and so on. In some embodiments, the request may be transmitted from the OEM side of the vehicle, e.g., from ECU 324, which communicates with sensors 122 (including, for example, gearshift sensor 212A, accelerator sensor 214A, brake sensor 216A, fuel cell sensor(s) 278A/280A, battery state of charge (SOC) sensors 282A/284A, HVAC sensor 224A, and other sensors 226A. The operating demands or requirements associated with one or more of the components of vehicle OEM systems 210 can be sent as a torque request, via ECU 324 to interface circuit 326 by way of a Controller Area Network (CAN bus).

It should be understood that in keeping with the standardized/modular aspect achieved through use of various embodiments, the J1939 (promulgated by the Society of Automotive Engineers (SAE)) standard may be used to communicate the torque request via the CAN bus (not shown). The J1939 would be understood by those of ordinary skill in the art to have the ability to provide information about engine speed and torque. In some embodiments, signal combiner 236 consolidates a user torque request with a signal from the transmission (transmission torque request) to produce a consolidated torque request 238. There may be certain conditions during which the transmission needs to request more torque, such as when switching gears when accelerating past a particular speed. When one of the conditions occurs at which the transmission needs to switch gears or request more torque, the request from the transmission may override the request for torque from the user.

At operation 402, the universal interface may determine a balance between one or more components of a second set of vehicle components for delivering the specified amount of torque. That is, vehicle non-OEM systems 330, which can include, but is not necessarily limited to modular drivetrain/powertrain components, such as the aforementioned MGs and inverters, fuel cells and batteries, and transmission. For example, a consolidated torque request 238 is sent to splitter 240. Splitter 240 determines how much torque should be provided by each of the parallel systems and/or determines what percentage of the total torque requested each parallel system should provide. There may be multiple factors that determine what percentage of the torque is provided by each parallel system. For example, the power for the accessories may be drawn from one of the parallel systems, which may leave less power available to that parallel system for providing torque. It should be understood that in some embodiments, splitter 240 can refer to a software algorithm. Inputs to splitter 240 may comprise temperatures of a fuel cell(s), battery, and motors, battery state of charge (SOC), or potentially other factors such as historical efficiency of the specific hardware on an individual vehicle. Splitter 240 optimizes all these factors along with the requests from a vehicle.

There may be competing optimization objectives between drivability and durability. For example, parallel system B may have a battery that needs to be recharged, and the power balance determined by splitter 240 may have parallel system A shoulder more of the load in order to protect parallel system B's battery, which may adversely affect drivability. In an embodiment, splitter 240 may rank performance targets for the vehicle. Splitter 240 uses each parallel system as a degree of freedom that can be modulated in order to optimize drivability, durability, proper battery management, efficiency, and/or performance (e.g., while maintaining or optimizing safety).

Splitter 240 makes at least an initial determination as to how to allocate power between the different parallel systems, and a signal torque request 242A is produced and is sent to limiter 244, which determines whether to further limit the amount of torque to request from a particular parallel system (e.g., parallel system A). Limiter 244 also receives a signal indicative of the maximum available power of the current parallel system, and the minimum power that is safe to run the current parallel system without causing damage to the current parallel system. If the torque requested by torque request signal 242A from splitter 240 is higher than the maximum, a feedback signal 242B is sent to splitter 240, which directs splitter 240 to recompute how to distribute the torque request between the parallel systems. Optionally, the maximum available torque may be requested by limiter 244 and/or a signal may be sent from limiter 244 to splitter 240 (that is, splitter 240 may, e.g., completely recompute how to redistribute the power request between all the parallel systems). Optionally still, splitter 240 may recompute how to distribute the power with the other parallel system and limiter 244 may send a power request for the maximum available power to inverter 272 as power request 246. Similarly, if the torque requested by the signal 242A from splitter 240 is lower than the minimum torque, then feedback signal 242B is sent to splitter 240, which directs splitter 240 to recompute how to distribute the torque request between the parallel systems. The output of limiter 244 may be torque request 246, which is a request for the amount of torque determined by limiter 244, and which is sent to inverter 272 for requesting torque from parallel system A.

Torque request 246 is also sent to torque-to-power converter 248, which is a component that converts the torque request into a request for an amount of power that will generate the requested torque. To make the conversion, the amount of torque requested for a unit change in angle of the rotor is computed, and the result may be multiplied by the expected efficiency of the motor in converting electrical power into torque. The output of torque-to-power converter 248 is power requested 250, which is sent to FC/battery power balancer 252. In an embodiment, prior to sending torque request 246 to sub system A, power requested 250, may perform further computations to determine whether power request 246 is acceptable, and if power request 246 is not acceptable, spit 240 recomputes the torque and/or power distribution. FC/battery balancer 252 may check whether each power request 246 individually or whether all of the power requests when combined into a power distribution is acceptable. In various embodiments, various checks for whether a power distribution is acceptable may be performed by splitter 240, limiter 244, or FC/battery balancer 252.

FC/battery balancer 252 may determine an appropriate balance between the power supplied by the battery system of a given parallel system and the power supplied by the fuel cell system of the same given parallel system, based on input from the battery and fuel cell of the current parallel system. For example, FC/battery balancer 252 may decide whether some of the power from the fuel cell should be used for recharging the high voltage battery. FC/battery balancer 252 may produce a maximum/minimum power signal 254, which is a signal that includes an indication of the maximum available power of the current parallel system (e.g., parallel system A) and the minimum safe power at which to operate the current parallel (e.g., to avoid cycling between the parallel system A toggling on and off). The maximum/minimum power signal 254 may be sent to signal combiners 228 and 230, so as to limit the power requested for the climate control and/or other accessories, if necessary. The maximum/minimum power signal 254 may also be sent to power-to-torque converter 256, which may divide the power requested by a unit of angle of revolution of the rotor of the motor. The result of the dividing the power requested by a unit of angle of revolution may then optionally be multiplied by an efficiency of the motor of the current parallel system in converting torque to power. The output of the power-to-torque converter 256 may be maximum/minimum torque 258, which is a signal indicating the maximum torque available to request from the current parallel system (e.g., parallel system A) and the minimum torque that is safe to request from the current parallel system. Maximum/minimum torque 258 is sent to limiter 244, which is used to determine whether the torque request from splitter 240 is between the maximum and minimum thresholds determined from maximum/minimum torque 258. If the request is not within the maximum and minimum threshold, the request may be set to the nearest of the maximum and minimum threshold to the value requested by splitter 244. Power/torque converter 260 may have the same function as the combination of power-to-torque converter 256 and torque-to-power converter 248. However, power/torque converter 260 performs the power-to-torque conversion for a different parallel system, e.g., parallel system B. Similarly, limiter 262 performs the same function as limiter 244, but for another parallel system, e.g., parallel system B.

At operation 404, the universal interface may instruct the one or more components of the second set of vehicle components to deliver a commensurate portion of the specified amount of torque. For example, inverter 272 receives torque request 246, and similarly, inverter 274 receives a similar torque request from limiter 262. Inverters 272 and 274 may include electrical inverters 222 and 242, and optionally power distribution circuit 220 and power distribution 240, respectively. Supplier 270 denotes the portion of vehicle 100 (regarding electric MGs and inverters for driving or receiving power from the MGs) supplied by an entity, e.g., an entity other than or different from the OEM. Supplier 276 denotes a portion of vehicle 100 supplied by another entity different from the OEM, and in this case, regarding the fuel cell and battery components of vehicle 100. Inverters 272 and 274 may draw power from the batteries/fuel cells (supplier 276), i.e., via fuel cells 278 and 280 and high voltage batteries 282 and 284, respectively. Fuel cells 278 and 280 and high voltage batteries 282 and 284 send signals to FC/battery power balancer 252. The power from inverters 274 and 276 power motor-generators MGA 278 and MGB 280, respectively, which in turn, power transmission 292 (which may be from yet another supplier 290). It should be noted that the particular breakdown/sourcing of vehicle components can vary. The examples illustrated and described herein are not meant to be limiting in any way. Again, embodiments of the present disclosure are directed to interfacing at least one OEM aspect/component of a vehicle (in this case, vehicle OEM systems 210) with at least one non-OEM aspect/component of the vehicle (in this case, vehicle non-OEM systems 330 regarding power/torque delivery in a seamless manner, negating a need for proprietary communications, integration, etc.

Each of signal combiners 220, 228, 230, splitter 240, limiter 244, torque to power convert 248, FC/battery power balancer 252, power-to-torque converter 256, power-torque converter 260, and limiter 262 are logic units that be implemented in software (by implementing one more machine instructions) and/or hardware. The same is true of interface circuit 326 which may comprise a data interface 304 for receiving signals, such as sensor signals from sensors 122 which can be ultimately converted in a torque request. Memory 306 comprises instructions that when executed by processor 308 may effectuate the requisite power/torque conversions, splitting/limiting determinations, etc.

Figure 5:
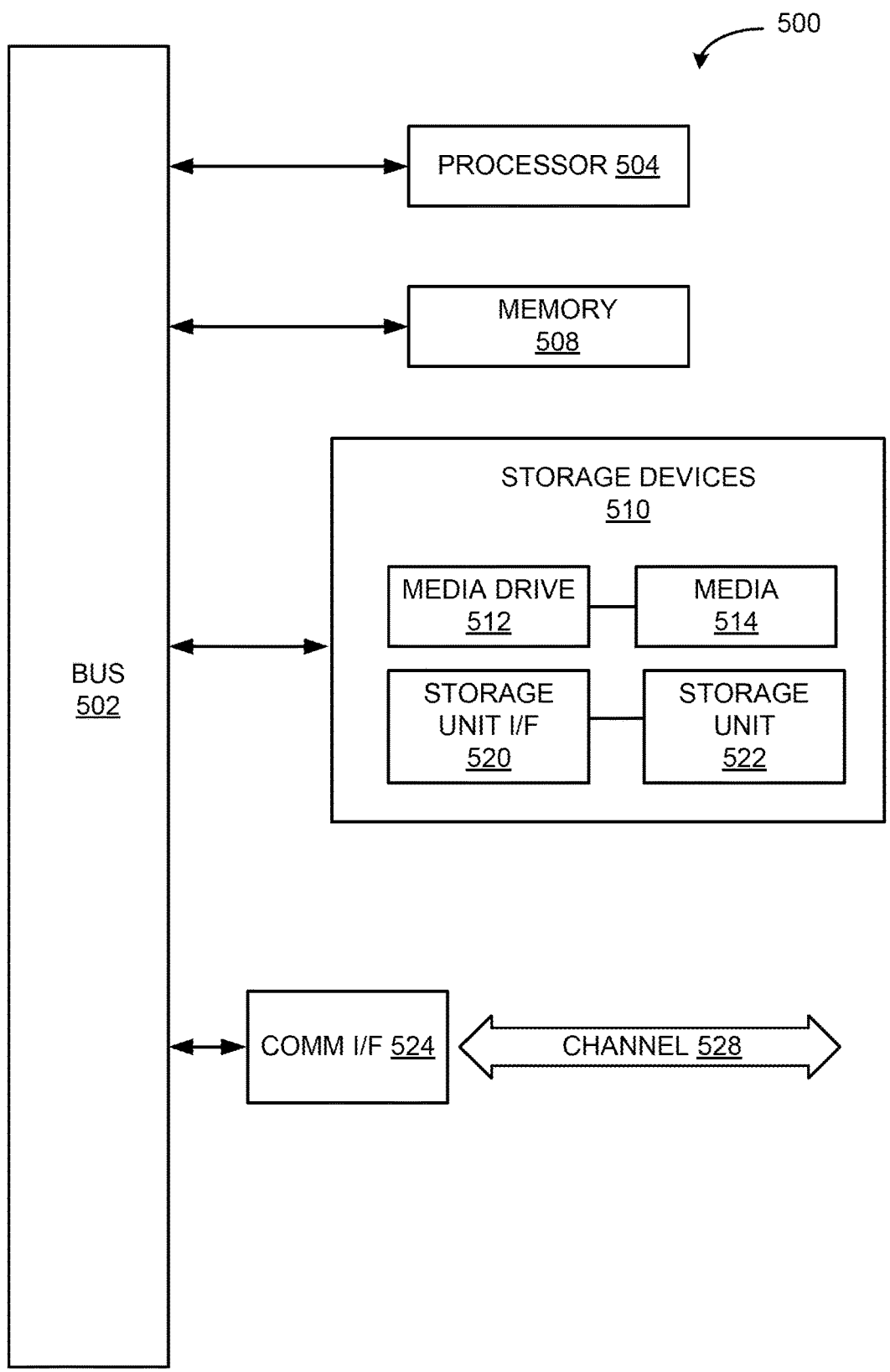
FIG. 5 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 200 may represent, for example, computing or processing capabilities found within computer processing units or any other type of special-purpose or general-purpose computing devices as may be desirable or appropriate for a given application or environment. Computing component 200 might also represent computing capabilities embedded within or otherwise available to a given device. For example, a computing component might be found in other electronic devices such as, for example, electronic devices that might include some form of processing capability.

Computing component 200 might include, for example, one or more processors, controllers, control components, or other processing devices. This can include a processor, and/or any one or more of the components making up electronic control device 50 and/or its component parts, hydraulic control circuit 40, or other components or elements of vehicle, e.g., signal sensors, etc. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 200 or to communicate externally.

Computing component 200 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 200 might likewise include a read only memory ("ROM") or other static storage device coupled to bus 502 for storing static information and instructions for processor 504.

The computing component 200 might also include one or more various forms of information storage mechanism 210, which might include, for example, a media drive 212 and a storage unit interface 220. The media drive 212 might include a drive or other mechanism to support fixed or removable storage media 214. For example, a hard disk drive, a solid state drive, a magnetic tape drive, an optical drive, a compact disc (CD) or digital video disc (DVD) drive (R or RW), or other removable or fixed media drive might be provided. Storage media 214 might include, for example, a hard disk, an integrated circuit assembly, magnetic tape, cartridge, optical disk, a CD or DVD. Storage media 214 may be any other fixed or removable medium that is read by, written to or accessed by media drive 212. As these examples illustrate, the storage media 214 can include a computer usable storage medium having stored therein computer software or data.

In alternative embodiments, information storage mechanism 210 might include other similar instrumentalities for allowing computer programs or other instructions or data to be loaded into computing component 200. Such instrumentalities might include, for example, a fixed or removable storage unit 222 and an interface 220. Examples of such storage units 222 and interfaces 220 can include a program cartridge and cartridge interface, a removable memory (for example, a flash memory or other removable memory component) and memory slot. Other examples may include a PCMCIA slot and card, and other fixed or removable storage units 222 and interfaces 220 that allow software and data to be transferred from storage unit 222 to computing component 200.

Computing component 200 might also include a communications interface 224. Communications interface 224 might be used to allow software and data to be transferred between computing component 200 and external devices. Examples of communications interface 224 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 224 may be carried on signals, which can be electronic, electromagnetic (which includes optical) or other signals capable of being exchanged by a given communications interface 224. These signals might be provided to communications interface 224 via a channel 228. Channel 228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 220, media 214, and channel 228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 200 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
receiving, by a universal interface implemented in a vehicle, a consolidated request for a specified amount of torque from one or more motive control components of a first set of vehicle components comprising an original equipment manufacturer (OEM) system;
determining, by the universal interface, a balance between one or more drivetrain and/or powertrain components of a second set of vehicle components comprising a non-OEM system for delivering the specified amount of torque based on operating characteristics of the one or more drivetrain and/or powertrain components; and
instructing, by the universal interface, the one or more components of the second set of vehicle components to deliver a commensurate portion of the specified amount of torque.

2. The method of claim 1, wherein the first set of vehicle components includes gearshifting, acceleration, and braking components.

3. The method of claim 1, wherein the second set of vehicle components includes motor-generator, inverter, fuel cell, battery, and transmission components.

4. The method of claim 1, wherein the request for the specified torque comprises a torque request at a prop shaft or drive shaft of the vehicle.

5. The method of claim 4, wherein determining the balance comprises balancing the one or more components including at least one of a motor and transmission to produce the specified torque at the prop shaft or drive shaft.

6. A vehicle, comprising:
a first group of vehicle motive control components, comprising an original equipment manufacturer (OEM) system, from which a consolidated user torque request is received;
a second group of vehicle drivetrain components, comprising a non-OEM system, providing motive force to wheels of the vehicle;
a third group of vehicle powertrain components, included in the non-OEM system, providing operative power to the second group of vehicle components; and
a universal interface receiving the consolidated user torque request, balancing operative output of the second group of vehicle components, and controlling at least one component of the second and third groups of vehicle components to deliver a specified amount of torque to the second group of vehicle components based on operating characteristics of one or more of the vehicle drivetrain and/or vehicle powertrain components.

7. The vehicle of claim 6, wherein the universal interface comprises splitter logic dividing the user torque request amongst the third group of vehicle components comprising at least a battery and a fuel cell.

8. The vehicle of claim 7, wherein the second group of vehicle components comprises at least a motor generator, and an inverter operatively connected to the battery and the fuel cell.

9. The vehicle of claim 8, wherein the splitter logic receives a supplemental torque request from the transmission.

10. The vehicle of claim 9, wherein the splitter logic takes as an input, the consolidated torque request comprising the user torque request and the supplemental torque request from the transmission.

11. The vehicle of claim 6, wherein the first group of vehicle components includes gearshifting, acceleration, and braking components.

12. The vehicle of claim 11, wherein the second group of vehicle components includes motor-generator, inverter, fuel cell, battery, and transmission components.

13. The method of claim 6, wherein the request for the specified torque comprises a torque request at a drive shaft or prop shaft of the vehicle.

14. The method of claim 1, wherein the one or more drivetrain and/or powertrain systems are divided into parallel drivetrain and/or powertrain systems.

15. The method of claim 14, wherein determining a balance comprises modulating use of each of the parallel drivetrain and/or powertrain systems to optimize one or more of vehicle drivability, vehicle durability, vehicle battery management, vehicle operational efficiency, and vehicle operational performance.

16. The vehicle of claim 6, wherein the vehicle drivetrain components and the vehicle powertrain systems are divided into parallel drivetrain and powertrain systems.

17. The method of claim 16, wherein balancing the operative output comprises modulating use of each of the parallel drivetrain and powertrain systems to optimize one or more of drivability, durability, battery management, operational efficiency, vehicle operational performance of the vehicle.

* * * * *